United States Patent [19]
Lanza et al.

[11] Patent Number: 6,048,961
[45] Date of Patent: Apr. 11, 2000

[54] PROCESS FOR THE DECOLORATION OF RESINOUS POLYMERS OF THE VINYL AROMATIC/CONJUGATED DIENE TYPE

[75] Inventors: Emmanuel Lanza, Waterloo, Italy; Jean Naveau, Nivelles, Belgium

[73] Assignee: Fina Research, S.A., Feluy, Belgium

[21] Appl. No.: 08/734,433

[22] Filed: Oct. 16, 1996

Related U.S. Application Data

[63] Continuation of application No. 07/769,908, Oct. 1, 1991, abandoned.

[30] Foreign Application Priority Data

Oct. 4, 1990 [BE] Belgium .............................. 09000942

[51] Int. Cl.$^7$ .............................. C08F 6/06; C08F 236/10
[52] U.S. Cl. .......................... 528/486; 526/173; 526/340
[58] Field of Search ............................. 528/486; 526/173, 526/340

[56] References Cited

U.S. PATENT DOCUMENTS 2,864,809 12/1958 Jones et al. .............................. 260/85.1
2,893,982 7/1959 Campbell .............................. 260/85.1

OTHER PUBLICATIONS

Encylopedia of Polymer Sciene and Engineering, vol. 6 entitled "Emulsion Polymerizing to Fibers, Manufacture", pp. 1–6.

Encylopedia of Polymer Sciene and Engineering, vol. 2 entitled "Anionic Polymerizing to Cationic Polymerizing", pp. 1–3.

*Primary Examiner*—Fred Teskin
*Attorney, Agent, or Firm*—Michael J. Caddell; M. Norwood Cheairs

[57] ABSTRACT

A process for eliminating color from vinyl aromatic/conjugated diene copolymers which process comprises treating the copolymers with a monocarboxylic acid having the general formula R—COOH, where R is a hydrocarbon radical comprising 2 to 4 carbon atoms and R further comprises linear or branched aliphatic radicals, cycloaliphatic radicals, alkenic radicals, aromatic radicals or alkylaromatic radicals.

8 Claims, No Drawings

PROCESS FOR THE DECOLORATION OF RESINOUS POLYMERS OF THE VINYL AROMATIC/CONJUGATED DIENE TYPE

CROSS-REFERENCE TO RELATED APPLICATION

Applicants claim priority for this application based upon their prior filing of same in Belgium on Oct. 4, 1990, Belgian Patent Application, No. 09000942, under the same named inventors and title as herein stated. This is also a continuation of Ser. No. 07/769,908, filed Oct. 1, 1991, to Lanza, et al now abandoned.

FIELD OF THE INVENTION

The invention relates to a process for the decoloration of resinous polymers of the vinyl aromatic/conjugated diene block copolymer type. More particularly the invention relates to a process for the decoloration of such copolymers obtained when starting from a (co)polymerization-initiating stage utilizing alkaline metal based catalysts.

BACKGROUND OF THE INVENTION

French Patent No. 1,149,159 discloses a process for removing the deep color caused by hydrogenation catalysts, from hydrogenated rubber polymers, by means of a mineral acid or of a monocarboxylic or polycarboxylic acid. The resulting polymers are transparent but with a yellowish tinge and have an improved transmittance achieved after a treatment which can take at least one hour on up to 36 hours. However, in the case of copolymers of resinous types, more particularly those disclosed in U.S. Pat. Nos. 3,639,517 and 4,091,053, the undesirable color is mainly due to the initiating agents used.

Not only for appearance sake, but also for uses in the field of foodstuff containers, it is very important to make this yellowish tinge disappear and to obtain completely colorless, transparent copolymers.

Methods are known for obtaining transparent copolymers by treating solutions of the copolymers with $CO_2$ and water. However, this requires a distillation of the solvent to separate it from the water and the $CO_2$ before it is recycled for polymerization, since otherwise these products would act as poisons to the initiator.

However, it must be remembered that in addition to transparency and coloration, the polymer must also maintain all its mechanical and shock-resisting properties, something which is not ensured by the aforementioned processes.

It is also known that an antioxidant additive must be added to these compositions in order to stabilize the butadiene phase during polymer transformation. In fact, the temperatures reached during this stage may cause a degradation of the polybutadiene phase. However, this kind of additive can clearly cause a coloring of the polymeric substance, so that it is desirable to reduce the quantity of antioxidant additive, and even more preferable to not have to add any.

European Patent No. 0084795 also suggests the treatment of polymers with carboxylic diacids. That type of process enables practically all the aforementioned decoloration conditions to be met, but without addressing the problem of the addition of an antioxidant additive.

European Patent No. 0309434 suggests that the copolymers should be treated with monocarboxylic acids containing chemically bonded sulphur. This process enables the amount of antioxidant additive that has to be added to be considerably reduced. Nevertheless, the process is only rarely used on an industrial scale, since the majority of these acids are solid at ambient temperature, having melting points higher than 100° C., and are quasi-insoluble in the majority of usual solvents. This causes considerable difficulties when using the copolymers, the result being the clogging of the ducts or a rapid degradation of the copolymers.

It therefore is desirable to have a process for the treatment of vinyl aromatic/conjugated diene copolymers which ensures that the copolymers remain completely colorless and transparent, retain appropriate shock-resistant properties, are safe and desirable for packaging foodstuffs, are given an antioxidant function without the need for the addition of antioxidant additives, and lastly are readily usable.

SUMMARY OF THE PRESENT INVENTION

The present invention discloses a process for the decoloration of vinyl aromatic/conjugated diene copolymers so as to meet the aforementioned criteria.

The present invention also discloses a process for the decoloration of vinyl aromatic/conjugated diene copolymers which are transparent, have satisfactory impact-resistant properties, and are advantageous for use in the field of foodstuffs.

The present invention also discloses a process for the decoloration of vinyl aromatic/conjugated diene copolymers which enables the amount of necessary antioxidant additive to be reduced.

The present invention also discloses a process for the decoloration of vinyl aromatic/conjugated diene polymers which enables the copolymers to be readily used.

The process according to the present invention for the decoloration of vinyl aromatic/conjugated diene copolymers obtained from alkali-metal based catalysts at the initiation stage is characterized in that the copolymers are treated with a monocarboxylic acid having the general formula R—COOH, where R is a hydrocarbon radical comprising 2 to 4 carbon atoms and is also a linear or branched aliphatic radical, cycloaliphatic radical or alkenic radical.

DESCRIPTION OF THE PREFERRED EMBODIMENTS

The monocarboxylic acids utilized in the present invention allow a ready application of the copolymers due to their low melting temperature and/or their outstanding solubility in at least one of the solvents which are useful in the process.

The process of the present invention can be used with copolymers of both the resinous and elastomeric types, prepared by anionic polymerization in a solution of vinyl aromatic monomers and conjugated diene in the presence of initiators of the alkali-metal compound type, polymerization being performed in a sequential manner; it being understood that one or more branches of the sequenced copolymer can be formed as a statistical copolymer.

This type of polymerization is conventionally performed in solution in the presence of a solvent and an initiator of the alkali-metal compound type. Moreover, during polymerization, coupling agents are often used to couple the polymers. The copolymers thus formed are most often found in a linear or radical form, but they have a coloring which is unacceptable for the required uses.

The processes for the polymerization of copolymers for use in the present invention are clearly described in U.S. Pat. Nos. 3,619,537 and 4,091,053, and in European Patents, Nos. 0084795 and 0270515. These polymerization processes can be readily summed up as follows:

Polymerization is performed in solution at a temperature of between −100° C. and +150° C., in the presence of a solvent and at a pressure adequate to keep the medium in the liquid phase. The solvents used can be paraffinic, cycloparaffinic or aromatic. Most frequently, cyclohexane or a mixture of hexane and cyclohexane are used as solvents.

If polymerization is performed using coupling agents, first a block of a non-elastomeric polymer is formed by charging vinyl aromatic monomer with a certain quantity of organolithium initiator, to form long chains of living polymers having a lithium atom on the chain end.

Then the chains of living polymers are brought into contact with monomers of conjugated dienes to form chains or copolymers having elastomeric and non-elastomeric blocks.

Then the copolymers of structure S—B (S=vinyl aromatic, =B=conjugated diene) are brought into contact with coupling agents to form copolymers of structure S—B—X—B—S (in the case of a linear structure), where X is the residue of the coupling agent.

In the case of a polymerization performed without a coupling agent, a sequenced block copolymer is formed by initially charging one of the two monomers, S, B, or a mixture of the two monomers, S/B, with a certain quantity of organolithium initiator in order to initiate polymerization. Then one of the monomers, S or B, or a mixture of the monomers, S/B, is charged successively and in the required order.

Clearly, copolymers of radical or linear structure can be formed, and the blocks can be formed as pure homopolymers or statistical copolymers.

Whatever the copolymers obtained by the various processes of anionic polymerization in solution may be, the process of the present invention can be utilized advantageously for the decoloration of said copolymers.

The conjugated diene monomer which is preferable to use is one having 4 to 12 carbon atoms, such as 1,3-butadiene; isoprene; 2,3-dimethyl-1, 3-butadiene; piperylene; 3-butyl-1, 3-octadiene; and the like. Vinyl aromatic monomers which are useful with the present invention are styrene, alphamethyl styrene, vinyl naphthalene, vinyl toluene, and the like.

Since the process applies equally well to resinous as well as elastomeric copolymers, the ratio by weight between the conjugated diene and the vinyl aromatic can vary within wide limits, more particularly between 1/99 and 85/15.

Initiators of the alkaline metal compound type which can be used include the following organolithium compounds: ethyl lithium, propyl lithium, butyl lithium, amyl lithium, hexyl lithium, cyclohexyl lithium, phenyl lithium, tollyl lithium, and naphthyl lithium and their isomers, more particularly sec.-butyl lithium and tert.-butyl lithium.

The coupling agents are preferably selected from multivinyl aromatic compounds, polyepoxys, polyisocyanates, polyimines, polyaldehydes, polyketones, polyhalides such as the silicon tetrahalides and the halosilanes, the polyanhydrides and polyesters, and also combinations of several of these types of coupling agents.

Suitable examples of useful multivinyl aromatic compounds include divinyl benzene; 1,2,4-trivinyl benzene; 1,3-divinyl naphthalene; 1,3,5-trivinylnaphthalene; 2,4-divinyl biphenyl; and the like.

Polyepoxy compounds may also be used, such as polymers of epoxy hydrocarbides, such as epoxy liquid polybutadiene, and epoxy vegetable oils, such as epoxy soya oil and epoxy linseed oil. Other epoxy compounds which can also be used are 1,2;5,6;9,10-triepoxydecane and the like.

Examples of useful polyisocyanates include 1,2,4-benzene-triisocyanate; 1,2,5,7-tetraisocyanate; and the like.

Examples of useful polyimines include the oxides or sulphides of triaziridinyl phosphine, such as the oxide of tri(1-aziridinyl) phosphine, the oxide of tri(2-methyl-1-aziridinyl) phosphine, the sulphide of (2-ethyl-3-decyl-1-aziridinyl) phosphine, and the like.

Examples of useful polyaldehydes are 1,4,7-naphthalene tricarboxaldehyde; 1,7,9-anthracene tricarboxaldehyde; 1,1,5-pentane tricarboxaldehyde; and the like.

Polyketones which may be used advantageously include 1,4,9,10-anthracene tetrone; 2,3-diacetonyl cyclohexane; and the like.

Examples of polyanhydrides which may be used advantageously include pyromellitic dianhydride, styrene-maleic anhydride copolymers, and the like.

Examples of useful polyesters include diethyl adipate, triethyl citrate, 1,3,5-tricarbethoxybenzene, and the like.

Among the polyhalides the following may be used: silicon tetrahalides, such as $SiCl_4$, $SiBr_4$ and $SiI_4$; trihalo silanes, such as trifluoro silane, trichloro silane, trichloroethyl silane, tribromobenzyl silane, and the like; and the halogen-substituted hydrocarbons, such as 1,3,5-tri(bromomethyl) benzene, 2, 15,6,9-tetrachloro-3,7-decadiene, and the like.

Examples of useful compounds having more than one type of functional group comprise 1,3-dichloro-2-propanone; 2,2-dibromo-3-decanone; 3,5,5-trifluoro-4-octanone; 2,4-dibromo-3-pentanone; 1,2,4,5-deepoxy-3-pentanone; 1,2,4,5-diepoxy-3hexanone; 1,2,11,12-diepoxy-8-pentadecanone; 1,3,18,19-diepoxy-7,14-eicosanedione; and the like.

Other metal halides can also be advantageous, such as tin, lead or germanium halide, and also the polyalkyoxys of metals, such as Si tetraethoxyde.

The bifunctional forms of these agents may be used if a linear polymer is required rather than a branched polymer.

As a rule, the total quantity of coupling agent is less than about 1.5 phr (parts per 100 parts of rubber).

The process of the present invention can be very advantageously utilized when the copolymer recovery process is based on a direct elimination of solvent.

Clearly, a proportion of the polymerization solvent can be removed before the polymer is treated by the process of the invention.

In one application of the inventive process, a polymer is treated with a linear or branched aliphatic monocarboxylic acid having the general formula R—COOH, where R is a hydrocarbon radical comprising 2 to 4 carbon atoms. Of the monocarboxylic acids, the following may be utilized advantageously: propionic acid, butyric acid, crotonic acid, and valeric acid. In one particular advantageous preferred embodiment of the present invention, propionic acid was used.

The quantity of acid to be used is between about 0.02 and about 2.0 parts per 100 parts of polymer; and preferably between about 0.1 and about 0.5 parts per 100 parts of polymer.

With the present invention it is possible to add the acids directly to the polymer solution or to add them mixed with one another, or to add them mixed with a solvent, such as cyclohexane.

In one preferred embodiment of the invention, monocarboxylic acid is added to the polymer solution after the polymer has been deactivated with a chain terminator selected from the group consisting of monoepoxides, and alcohols such as hindered alkylphenols. Preferably, monoepoxides are used and one preferable monoepoxide is propylene oxide.

Indeed, it was found that introduction of the acid after the deactivation of the living polymer produces a polymer having better optical properties than if the same acid is also used as a chain terminator.

It was also found that by using the acids according to the present invention, a completely transparent polymer is obtained, and that as an additional beneficial result, certain resistance to oxidation is conferred on the polymer which allows a considerable reduction in the amount of necessary secondary antioxidant additive, such as the phosphite type and the like, which must be utilized.

The following examples are given to better illustrate the process of the present invention, without intending to limit the scope thereof.

EXAMPLES 1 TO 3

A copolymer of the type $S_1$—$B_1$—B/S—$S_2$ was prepared which had a styrene-butadiene ratio by weight of 75/25.

The following quantities, calculated per X100 parts by weight, of monomers of styrene and 1,3-butadiene were introduced into a pressurized reactor.

First 471 parts of a solvent mixture were obtained by using 85% cyclohexane and 15% n-hexane.

Then THF was introduced at the rate of 0.07 phr and monomeric styrene at the rate of 16.7 phr.

The temperature of the reaction medium was then brought to 65° C. and n-butyl lithium was injected in the form of a 20% solution into the cyclohexane, in sufficient quantity to obtain a value of 0.083 phr in the medium.

Then sequenced polymerizarion was performed by simultaneously injecting 25 parts of 1,3-butadiene and 58.3 parts of styrene.

For examples 1 and 2, the living polymer thus formed was deactivated by the addition of 0.7 phr of propylene oxide. In example 3, no propylene oxide was added to the polymer solution.

Quantities of monocarboxylic acid were introduced as indicated in the following Table 1, and also a small quantity of an antioxidant system formed by 0.4 phr of Irganox 1076 and 0.7 phr of TNPP. The solution obtained on completion of that stage was colorless.

After drying the rubber, sheets of polymer around 2 mm in thickness were prepared. The sheet was treated for 20 minutes at 160° C. and the following optical properties were observed:

TABLE 1

| Ex. | phr | Opacity Index | Transmittance | Yellow index |
| --- | --- | --- | --- | --- |
| 1. Propionic acid | 0.09 | 4.6 | 90.8 | 1.4 |
| 2. Crotonic acid | 0.104 | 5.2 | 90.8 | 0.6 |
| 3. Propionic acid | 0.09 | 5.9 | 88.9 | 4.2 |

It is clear from the examples that the introduction of the acid after the deactivation (examples 1 and 2) leads to a polymer showing better optical properties than if the same acid is also used as a chain terminator (example 3).

Thus the present invention provides a process for obtaining transparent colorless copolymers of the type utilizing monovinyl aromatic compounds and conjugated dienes without sacrificing desirable mechanical properties and without the need for high levels of undesirable antioxidants in the copolymers.

Although specific preferred embodiments of the present invention has been described in the detailed description above, the description is not intended to limit the invention to the particular forms or embodiments disclosed therein since they are to be recognized as illustrative rather than restrictive and it would be obvious to those skilled in the art that the invention is not so limited. Thus, the invention is declared to cover all changes and modifications of the specific examples of the invention herein disclosed for the purposes of illustration which do not constitute departure from the spirit and scope of the invention.

The embodiments of the invention in which an exclusive property or privilege is claimed are defined as follows:

We claim:

1. A process for decolorizing vinyl aromatic/conjugated diene copolymers which have polymer chains which end with an alkali metal and are obtained by solution polymerization of at least one vinyl aromatic hydrocarbon and a conjugated diene in the presence of a catalyst based on an alkali metal, comprising treating the copolymer with a monocarboxylic acid having the general formula R—COOH, where R is a hydrocarbon radical comprising 2 to 4 carbon atoms comprising linear or branched aliphatic radicals, cycloaliphatic radicals or alkenic radicals.

2. A process according to claim 1, characterized in that the monocarboxylic acid is chosen from propionic acid, butyric acid, valeric acid, and/or crotonic acid.

3. A process according to claim 1, characterized in that the conjugated diene is selected from 1,3-butadiene, isoprene and 2,3-dimethyl-1,3-butadiene.

4. A process according to claim 1, characterized in that the vinyl aromatic hydrocarbon is selected from styrene, alpha-methyl styrene vinyl toluene and vinyl naphthalene.

5. A process according to any of claims 1–4, characterized in that the copolymer is a conjugated diene/vinyl aromatic sequenced copolymer whose ratio by weight is between 1:99 and 85:15.

6. A process according to claim 5, characterized in that the sequenced copolymer is a butadiene/styrene copolymer.

7. A process according to any of claims 1–4, characterized in that the monocarboxylic acid is used at the rate of 0.1 to 0.5 parts per 100 parts of polymer.

8. A process according to any of claims 1–4, characterized in that the monocarboxylic acid is added directly to the copolymer solution.

* * * * *